(12) United States Patent
Kim et al.

(10) Patent No.: US 10,712,299 B2
(45) Date of Patent: Jul. 14, 2020

(54) DEFORMATION MEASURING APPARATUS AND METHOD OF EVALUATING DEFORMATION USING THEREOF

(71) Applicant: SAMSUNG ELECTRONICS CO., LTD., Suwon-si (KR)

(72) Inventors: Ga Hee Kim, Yongin-si (KR); Young Suk Jung, Suwon-si (KR); Yoo Seong Yang, Yongin-si (KR); Young Hoon Lee, Incheon (KR); Hyun Mi Lee, Seoul (KR)

(73) Assignee: SAMSUNG ELECTRONICS CO., LTD., Gyeonggi-Do (KR)

( * ) Notice: Subject to any disclaimer, the term of this patent is extended or adjusted under 35 U.S.C. 154(b) by 0 days.

(21) Appl. No.: 15/483,776

(22) Filed: Apr. 10, 2017

(65) Prior Publication Data
US 2018/0128758 A1 May 10, 2018

(30) Foreign Application Priority Data
Nov. 8, 2016 (KR) .......................... 10-2016-0148341

(51) Int. Cl.
*G01N 25/16* (2006.01)
*G01B 5/30* (2006.01)

(52) U.S. Cl.
CPC .............. *G01N 25/16* (2013.01); *G01B 5/30* (2013.01)

(58) Field of Classification Search
None
See application file for complete search history.

(56) References Cited

U.S. PATENT DOCUMENTS

| 4,354,764 A | * | 10/1982 | Achermann | ........... G01N 25/00 374/46 |
| 5,133,210 A | * | 7/1992 | Lesko | ...................... G01N 3/42 374/46 |
| 5,251,498 A | * | 10/1993 | Nakatsukasa | ............ G01B 7/16 177/245 |
| 2005/0103120 A1 | | 5/2005 | Liu et al. | |
| 2014/0275394 A1 | * | 9/2014 | Allen | ................. C09D 133/066 524/507 |
| 2015/0185117 A1 | * | 7/2015 | Schmitz | ................... G01B 3/00 324/691 |

FOREIGN PATENT DOCUMENTS

| EP | 2390649 | 11/2011 |
| JP | 11153556 | 6/1999 |
| JP | 2007285725 | 11/2007 |
| KR | 1020110097283 | 8/2011 |

* cited by examiner

*Primary Examiner* — Matthew G Marini
(74) *Attorney, Agent, or Firm* — Cantor Colburn LLP (57) ABSTRACT

A deformation measuring apparatus of a specimen includes: a holder which supports the specimen; a contact portion disposed facing the holder and including a hemispherical tip; a position controlling portion which adjusts a position of the contact portion along a thickness direction of the specimen to allow the hemispherical tip to be in contact with a surface of the specimen; a heating chamber which accommodates the holder and the contact portion and heating the specimen; and a sensing portion which measures at least one of a thermal deformation force (F) of the specimen or a thickness direction thermal expansion (Δh) of the specimen.

14 Claims, 9 Drawing Sheets

DEFORMATION MEASURING APPARATUS AND METHOD OF EVALUATING DEFORMATION USING THEREOF

RELATED APPLICATIONS

This application claims priority to Korean Patent Application No. 10-2016-0148341, filed on Nov. 8, 2016, and all the benefits accruing therefrom under 35 U.S.C. § 119, the content of which in its entirety is herein incorporated by reference.

BACKGROUND

1. Field

This disclosure relates to a deformation measuring apparatus and a method of evaluating deformation using the deformation measuring apparatus, and particularly an apparatus for measuring a thermal deformation force and/or thermal expansion of a material and a method of evaluating thickness direction deformation properties of a material using the apparatus.

2. Description of the Related Art

Recently, it has been actively researched for down-sizing and integrating parts in electronic devices, so various techniques of down-sizing and integrating parts for the electronic devices have been also improved. For down-sizing the parts, thin-filming technologies such as sputtering and deposition are employed. As the thin filming technologies have been developed, techniques for evaluating properties of the obtained thin film are desired.

A universal testing machine ("UTM"), or a dynamic mechanical analyzer ("DMA"), or the like, is conventionally used as an apparatus for evaluating properties of the thin film. Using the UTM or the DMA, properties of the thin film in an in-plane direction may be easily measured.

SUMMARY

In a case of a thin film used as a protecting layer or a separating membrane for a rechargeable battery, properties at a thickness direction (out-of-plane direction), which is a direction to be stressed when is applied in a real electronic device is desired to be measured, instead of the in-plane direction properties of the thin film. However, properties of the thin film at the thickness direction may not be effectively measured using a universal testing machine ("UTM"), or a dynamic mechanical analyzer ("DMA").

A method using a nano-indenter is also known as a method for measuring properties of the thin film at the thickness direction. However, the nano-indenter presses a surface of the specimen using a nano-scaled tiny tip, so that the strain information of the pressed portion is limited to a nano-scale, and it is difficult to measure the real area which is in contact with the nano-indenter. In addition, as the nano-indenter has a large deviation according to a surface roughness of the thin film, the measurement may be repeated in a plurality of positions of a thin film, and the cost for the measurement may increase as a result.

Embodiments of the invention relate to a deformation measuring apparatus which measures thickness direction properties of a specimen in a relatively simple method with reduced cost, and a method of measuring deformation using the deformation measuring apparatus.

According to an embodiment, a deformation measuring apparatus includes a holder which supports a specimen; a contact portion disposed facing the holder and including a hemispherical tip; a position controlling portion which adjusts a position of the contact portion along a thickness direction of the specimen to allow the hemispherical tip to be in contact with a surface of the specimen; a heating chamber in which the holder and the contact portion are disposed, and heating the specimen; and a sensing portion which measures at least one of a thermal deformation force of the specimen and a thickness direction thermal expansion of the specimen.

In an embodiment, the hemispherical tip may have a radius of curvature in a range of about 0.1 micrometer ($\mu m$) to about 5 millimeters (mm).

In an embodiment, the position controlling portion may include a linear transporting portion connected to the contact portion, where the linear transporting portion linearly moves along the thickness direction of the specimen in the heating chamber, and an operation controller which controls an operation of the linear transporting portion or fixes the linear transporting portion in a predetermined position.

In an embodiment, the heating chamber may include a body which accommodates the holder and the contact portion; a door mounted in a side of the body to allow the specimen to be disposed inside the body; and a through-hole defined in the upper part of the body, where the linear transporting portion linearly moves in the heating chamber through the through-hole.

In an embodiment, the sensing portion may be electrically connected to at least one of the contact portion and the position controlling portion.

According to another embodiment, a method of evaluating deformation of a specimen using the deformation measuring apparatus includes: disposing the specimen on the holder to face the contact portion; adjusting a position of the contact portion along the thickness direction of the specimen so that the hemispherical tip of the contact portion is in contact with the surface of the specimen; measuring at least one of the thermal deformation force (F) of the specimen and the thickness direction thermal expansion ($\Delta h$) of the specimen while heating the specimen; and evaluating a deformation of the specimen by the heating using at least one of the measured thermal deformation force (F) of the specimen and the measured thickness direction thermal expansion ($\Delta h$) of the specimen.

In an embodiment, the adjusting the position of the contact portion along the thickness direction of the specimen may include disposing the contact portion to be in contact with the surface of the specimen and then fixing a position of the disposed contact portion.

In an embodiment, the specimen may be heated by increasing an inner temperature of the heating chamber.

In an embodiment, an inside of the heating chamber may be in vacuum state.

In an embodiment, the evaluating the deformation of the specimen may include: calculating a length ($L_1$) of a portion of the surface of the heated specimen, which is in contact with the surface of the specimen using the measured thickness direction thermal expansion ($\Delta h$) of the specimen, wherein the length ($L_1$) is measured based on a cross-sectional surface cut along the thickness direction of the specimen; and comparing the calculated length of the portion of the surface of the heated specimen in contact with the hemispherical tip to a length ($L_0$) of a corresponding portion of the surface of the specimen before being heated to calculate a thermal deformation ($\Delta L = L_1 - L_0$) of the specimen.

In an embodiment, the thermal deformation ($\Delta L$) of the specimen may satisfy the following equation:

$$\Delta L = \frac{\pi r \times \frac{\theta}{180} - r\sin\theta}{r\sin\theta} \times 100,$$

where $$\theta = \cos^{-1}\left(1 - \frac{\Delta h}{r}\right),$$

and r denotes a radius of curvature of the hemispherical tip.

In an embodiment, the evaluating the deformation of the specimen may include calculating a thermal stress ($\sigma$) of the specimen using a contact area (S) and the measured thermal deformation force (F) of the heated specimen, where the contact area (S) is defined as an area covered with the hemispherical tip in a plane among an uppermost surface of the specimen.

In an embodiment, the thermal stress ($\sigma$) may satisfy the following equation:

$$\sigma = \frac{F}{\pi(r\sin\theta)^2},$$

where $$\theta = \cos^{-1}\left(1 - \frac{\alpha \Delta T}{r}\right),$$

r denotes a radius of curvature of the hemispherical tip, $\alpha$ denotes a coefficient of linear expansion of the specimen, and $\Delta T$ denotes a temperature change according to the heating.

In an embodiment, the evaluating the deformation of the specimen may include calculating a thermal deformation ($\Delta L$) of the specimen using the measured thickness direction thermal expansion ($\Delta h$) of the specimen and calculating a thermal stress ($\sigma$) of the specimen using the measured thermal deformation force (F) of the specimen; and calculating an elastic modulus (M) of the specimen using the calculated thermal deformation ($\Delta L$) of the specimen and the calculated thermal stress ($\sigma$) of the specimen.

In an embodiment, the elastic modulus (M) of the specimen may satisfy the following equation:

$$M = \frac{F}{100 \times \pi r \sin\theta \left(\pi r \times \frac{\theta}{180} - r\sin\theta\right)},$$

where $$\theta = \cos^{-1}\left(1 - \frac{\Delta h}{r}\right),$$

and r denotes a radius of curvature of the hemispherical tip.

According to embodiments of the invention as described herein, thickness direction properties of the specimen may be effectively measured and evaluated without damaging the specimen in a relatively simple method with reduced cost.

BRIEF DESCRIPTION OF THE DRAWINGS

These and/or other features of the invention will become apparent and more readily appreciated from the following detailed description of embodiments thereof, taken in conjunction with the accompanying drawings, in which.

DETAILED DESCRIPTION

The invention now will be described more fully hereinafter with reference to the accompanying drawings, in which various embodiments are shown.

This invention may, however, be embodied in many different forms, and should not be construed as limited to the embodiments set forth herein. Rather, these embodiments are provided so that this disclosure will be thorough and complete, and will fully convey the scope of the invention to those skilled in the art. Like reference numerals refer to like elements throughout.

It will be understood that when an element is referred to as being "on" another element, it can be directly on the other element or intervening elements may be present therebetween. In contrast, when an element is referred to as being "directly on" another element, there are no intervening elements present. The terminology used herein is for the purpose of describing particular embodiments only and is not intended to be limiting. As used herein, the singular forms "a," "an," and "the" are intended to include the plural forms, including "at least one," unless the content clearly indicates otherwise. "Or" means "and/or." As used herein, the term "and/or" includes any and all combinations of one or more of the associated listed items. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Furthermore, relative terms, such as "lower" or "bottom" and "upper" or "top," may be used herein to describe one element's relationship to another element as illustrated in the Figures. It will be understood that relative terms are intended to encompass different orientations of the device in addition to the orientation depicted in the Figures. For example, if the device in one of the figures is turned over, elements described as being on the "lower" side of other elements would then be oriented on "upper" sides of the other elements. The exemplary term "lower," can therefore, encompasses both an orientation of "lower" and "upper," depending on the particular orientation of the figure. Similarly, if the device in one of the figures is turned over, elements described as "below" or "beneath" other elements would then be oriented "above" the other elements. The exemplary terms "below" or "beneath" can, therefore, encompass both an orientation of above and below.

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system).

Herein, a deformation measuring apparatus refers to an apparatus for measuring deformation of a specimen, specifically, an apparatus for measuring a thermal deformation force due to the thermal deformation of the specimen or a thickness direction thermal expansion of the specimen in a relatively simple method.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Exemplary embodiments are described herein with reference to cross section illustrations that are schematic illustrations of idealized embodiments. As such, variations from the shapes of the illustrations as a result, for example, of manufacturing techniques and/or tolerances, are to be expected. Thus, embodiments described herein should not be construed as limited to the particular shapes of regions as illustrated herein but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present claims.

Herein, a specimen for the deformation measuring apparatus may include a specimen in which a film including a material to be measured is formed on a substrate. However, it assumes that the "film-substrate type specimen" is a case that the material to be measured is formed in a thin film or a thick film (e.g., a separation membrane, an optical film, etc. in a rechargeable battery), but an embodiment is not limited to the film-substrate type specimen.

For example, when the material to be measured is used in a general bulk shape, it may use a "bulk type specimen" in which a material to be measured is formed as a single body. In an embodiment, the measuring method and the evaluating method using the deformation measuring apparatus are the same regardless of types of specimen.

Hereinafter, for convenience of description, embodiments of the deformation measuring apparatus employed with the "film-substrate type specimen" will be described in detail.

Figure 1:
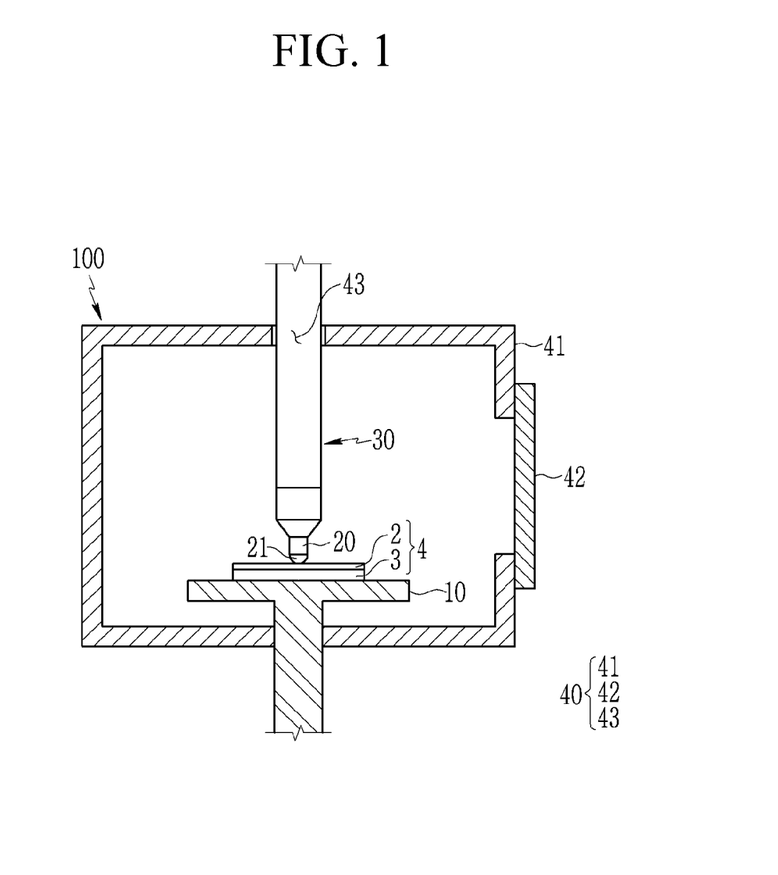
FIG. 1 is a schematic view showing a deformation measuring apparatus according to an embodiment.

FIG. 1 is a schematic view of a deformation measuring apparatus according to an embodiment.

Referring to FIG. 1, an embodiment of the deformation measuring apparatus 100 includes a holder 10 which supports a specimen 4 to be measured; a contact portion 20 disposed facing the holder 10 and including a hemispherical tip; a position controlling portion 30 connected to the contact portion 20; and a heating chamber 40 that accommodates the holder 10 and the contact portion 20.

In an embodiment, the specimen 4 may include a substrate 3 and a film 2 disposed on the substrate 3.

The film 2 may include materials to be measured, for example, plastic, metal, an inorganic material, or a combination thereof. A thickness of the film 2 is not particularly limited. In one embodiment, for example, the film 2 may be a thin film having a thickness of less than or equal to several millimeters or a thick film having a thickness of several millimeters to several tens millimeters.

The method of providing or forming the film 2 on a substrate 3 is not particularly limited. The film 2 may be formed using, for example, sputtering, deposition, plating, solution process, or the like.

The substrate 3 supports the film formed thereon. The material of the substrate 3 is not particularly limited. In one embodiment, for example, the substrate 3 may include a material including plastic, glass, metal, or a combination thereof. The substrate 3 has a thermal expansion coefficient at least lower than that of the film 2 to be measured such that the substrate 3 is effectively prevented from being deformed prior to the film when the specimen 4 is heated. The specific materials for the substrate 3 may be selected considering the thermal expansion coefficient of the film 2 to be measured. In one embodiment, for example, when the film 2 includes plastic having relatively high thermal expansion coefficient, the substrate 3 may include or be formed of a glass having a significantly lower thermal expansion coefficient than the film 2.

The holder 10 supports a lower part of the specimen 4 positioned thereon. The specimen 4 may be disposed in way so that the film 2 is positioned at upper side of the holder 10 or on upper surface of the holder 10. The contact portion 20 may be disposed facing to the holder 10. The contact portion 20 may include a hemispherical tip 21 to be in direct contact with the film 2. The hemispherical tip 21 may have a hemisphere shape protruded in a direction toward the film 2.

The hemispherical tip 21 may have a predetermined radius of curvature, which may be variously determined based on a thickness, a size, a material, and the like of the film 2 or the "bulk type specimen" to be measured. The hemispherical tip 21 may have a radius of curvature of, for example, greater than or equal to about 0.1 micrometer (µm), for example, greater than or equal to about 1 µm, for example, greater than or equal to about 10 μm, for example, greater than or equal to about 100 μm, for example, greater than or equal to about 1000 μm, and for example, less than or equal to about 10 mm, for example, less than or equal to about 9 mm, for example, less than or equal to about 8 mm, for example, less than or equal to about 7 mm, for example, less than or equal to about 6 mm, for example, less than or equal to about 5 mm. As the hemispherical tip 21 has a radius of curvature within the range described above, the error caused by the surface state of the material to be measured may be minimized compared to the nano-scaled nano-indenter, and the thickness direction deformation may be measured and evaluated and then standardized in a simple method with less cost.

When setting up an imaginary circle including a half circle cutting the hemisphere of the hemispherical tip 21, an eccentricity of the imaginary circle may be, for example, greater than or equal to about 0 and less than or equal to about 0.0001, for example, greater than or equal to about 0 and less than or equal to about 0.00001, for example, about zero (0). Thereby, the contact area between the hemispherical tip 21 and the film 2 may be easily measured without error.

Figure 2:
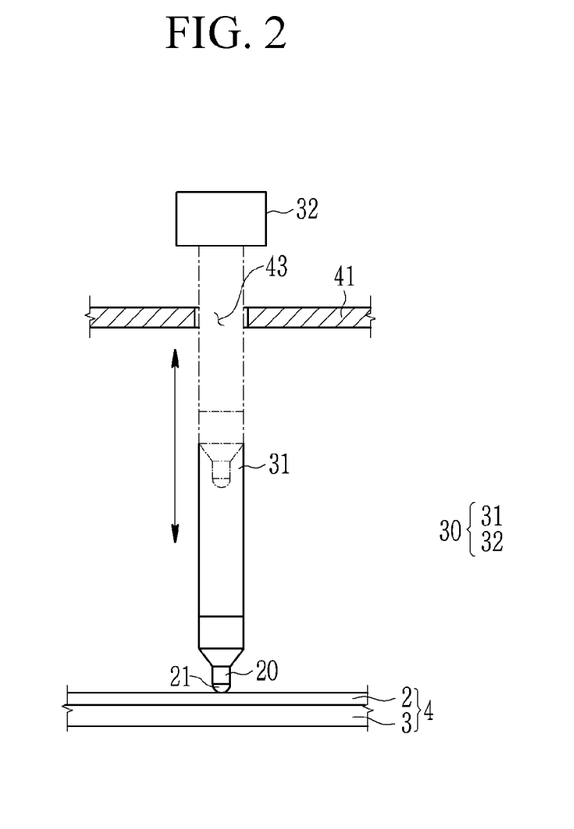
FIG. 2 is a schematic view showing an operation of a position controlling portion of the deformation measuring apparatus shown in FIG. 1.

FIG. 2 is a schematic view showing an operation of a position controlling portion of the deformation measuring apparatus shown in FIG. 1.

In an embodiment, the position controlling portion 30 may control a position of the contact portion 20 so that the hemispherical tip 21 is contacted to a surface of the film 2. In such an embodiment, the position controlling portion 30 may linearly transport the contact portion 20 along a thickness direction of the specimen 4, to control a gap or distance between the hemispherical tip 21 and the surface of the film 2. Referring to FIG. 2, the position controlling portion 30 may include a linear transporting portion 31 and an operation controller 32.

The linear transporting portion 31 is connected to the contact portion 20 at an opposite side from the hemispherical tip 21. The linear transporting portion 31 may linearly transport the contact portion 20 along the thickness direction of the specimen 4.

The operation controller 32 may be electrically and/or physically connected to the linear transporting portion 31 to control transporting operations of the linear transporting portion 31 and fixing the linear transporting portion 31 in a predetermined position. In such an embodiment, the operation controller 32 may control the contact portion 20 to move down in the thickness direction of the specimen 4 until the hemispherical tip 21 in direct contacts with the surface of the film 2, and may stop the linear transporting portion 31 when the terminal end of the hemispherical tip 21 is in contact with the surface of the film 2 and fix the hemispherical tip 21 at the corresponding position. The hemispherical tip 21 that the position thereof is fixed by the operation controller 32 may be not deviated from the fixed position even when the hemispherical tip 21 is applied with a thermal deformation force by thermal expansion of the film 2.

According to an embodiment, the position controlling portion 30 is not limited to a specific composition as long as the position controlling portion 30 may linearly transport the position of the contact portion 20. In one embodiment, for example, the position controlling portion 30 may include a transducer such as a hydraulic pressure actuator, a rack/pinion actuator, a linear variable displacement transducer ("LVDT"), and the like.

In an embodiment, referring back to FIG. 1, the heating chamber 40 accommodates the holder 10 and the contact portion 20 and may function to heat the specimen disposed inside thereof. The inner temperature of the heating chamber 40 may be variously controlled based on materials of the film 2 and the substrate 3, a thickness, a volume, a thermal expansion coefficient, a glass transition temperature, or the like. The heating chamber 40 may include a body 41 that accommodates the holder 10 and the contact portion 20, a door 42 provided or mounted in a side of the body 41, through which the specimen 4 is provided inside the body 41, and a through-hole 43 defined in an upper part of the body. In such an embodiment, the linear transporting portion 31 and the contact portion 20 is inserted into or disposed through the through-hole 43 to linearly moves in the thickness direction of the specimen 4.

According to an embodiment, the heating chamber 40 is not particularly limited to a particular constitution as long as the heating chamber 40 uniformly heats the specimen 4 to induce thermal expansion of the film 2 at a thickness direction. In an embodiment, the heating chamber 40 may be evaporated under reduced pressure or may be controlled to provide the various atmosphere gas (e.g., inert gas, etc.) conditions. The inner condition of the heating chamber 40 may be variously controlled according to a thickness of the film 2, a size, a material, a heating temperature, a heating time, and the like.

Figure 3:
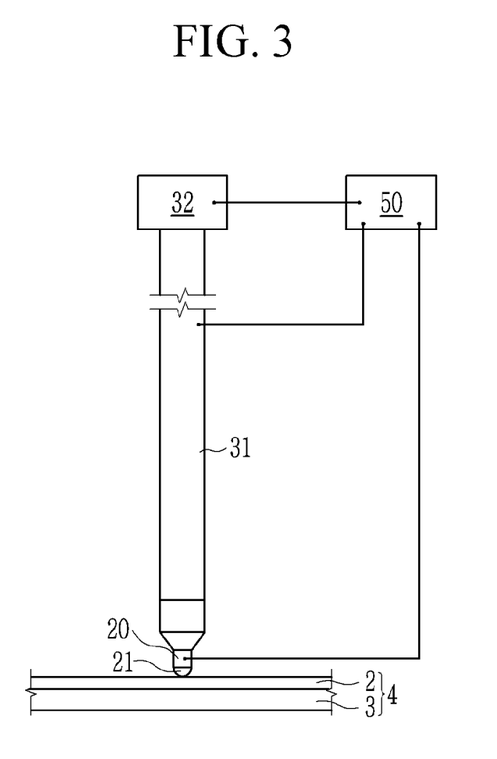
FIG. 3 is a schematic view showing a connecting relation of a sensing portion in the deformation measuring apparatus shown in FIG. 1.

FIG. 3 is a schematic view showing a connection relationship with a sensing portion in FIG. 1.

In an embodiment, the deformation measuring apparatus may further include a sensing portion 50 that measures a deformation of the film by heating. Referring to FIG. 3, the sensing portion 50 may be electrically connected to the contact portion 20 and/or the position controlling portion 30. The sensing portion 50 may measure either a thermal deformation force (F) of the specimen by the heating or a thickness direction thermal expansion ($\Delta h$) of the specimen.

Herein, the thermal deformation force (F) of the specimen 4 means a force applied to the position-fixed hemispherical tip 21 by the thermally-expanded film 2 (the force derived from the thermal expansion of the film 2), and the thermal expansion ($\Delta h$) of the specimen 4 means a thickness increase or change of the film 2 due to thermal expansion.

Hereinafter, with further references to FIGS. 4 and 5 together with FIGS. 1 to 3, how the deformation of the specimen is evaluated using the deformation measuring apparatus will be described.

An embodiment of a method of evaluating deformation of a specimen 4 may include: disposing the specimen 4 between the holder 10 and the contact portion 20 facing the holder 10; adjusting a position of the contact portion 20 along the thickness direction of the specimen 4 so that the hemispherical tip 21 of the contact portion is in direct contact with a surface of the specimen 4; measuring at least one of a thermal deformation force (F) of the specimen or a thickness direction thermal expansion ($\Delta h$) of the specimen while heating the specimen; and evaluating the deformation of the specimen by heating using at least one of the measured thermal deformation force (F) of the specimen or the measured thickness direction thermal expansion ($\Delta h$) of the specimen.

In such an embodiment, the specimen 4 is disposed between the holder 10 and the contact portion 20. The specimen 4 is introduced in the heating chamber 40 and positioned on the holder 10. The specimen 4 may include a substrate 3 and a film 2 on the surface of the substrate 3, as described above, and the specimen 4 is disposed in a way such that the film is disposed opposite to or to face the contact portion 20. In such an embodiment, the inner temperature of the heating chamber 40 is maintained under the temperature condition similar to the room temperature during a process of disposing the specimen 4 between the holder 10 and the contact portion 20.

Subsequently, the contact portion 20 is moved down or lowered along the thickness direction of the specimen 4 by the position controlling portion 30 so that the hemispherical tip 21 is in contact with the surface of the film 2. In such an embodiment, when the contact portion 20 is disposed to be in contact with the surface of the specimen 4, the position of the disposed contact portion 20 is fixed. In such an embodiment, when the terminal end of the hemispherical tip 21 is in contact with the surface of the film 2, the transport of the linear transporting portion 31 is stopped by the operation controller 32 to fix the contact portion 20 at the corresponding position.

Figure 4:
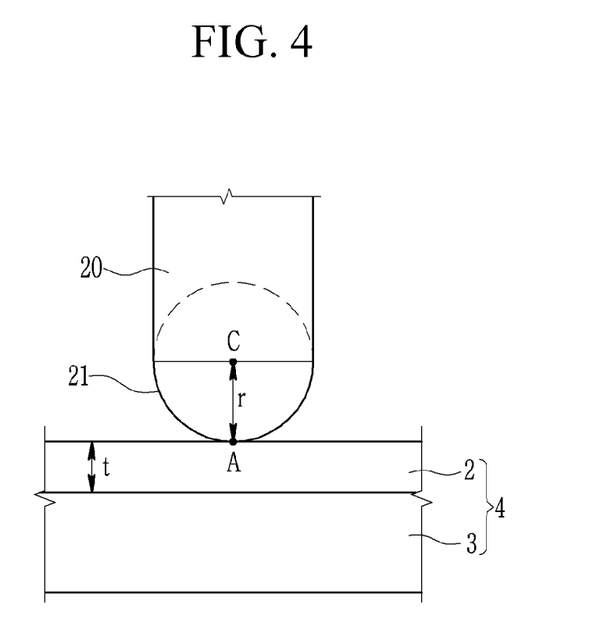
FIG. 4 is a view showing that a terminal end of a hemispherical tip of the deformation measuring apparatus shown in FIG. 1 is fixed at a position when the hemispherical tip 21 is in contact with a surface of a film.

FIG. 4 is a view showing that the end portion of the hemispherical tip 21 is fixed at the position when the hemispherical tip 21 is in contact with the surface of the film.

Referring to FIG. 4, the terminal end of the hemispherical tip 21 is in contact with the surface of the film 2 at a point A. In such an embodiment, the contact portion 20 is controlled to maintain the position thereof to be in contact with the surface of the film 2 without pressing or deforming the film 2.

In an embodiment, as shown in FIG. 4, when setting up an imaginary circle including a half circle cutting a hemisphere shape of the hemispherical tip 21, a line $\overline{AC}$ connecting a center C of the imaginary circle to the point A where the hemispherical tip 21 is in contact with the surface of the film 2 is defined as a radius of curvature (r) of the hemispherical tip 21. In such an embodiment, the film 2 before heating has a predetermined thickness t.

Subsequently, the temperature in the heating chamber 40 is increased to uniformly heat the whole area of the specimen 4. In such an embodiment, in the inner space of the heating chamber 40 may be in vacuum state, or a variety of atmosphere gas may be injected into the heating chamber 40.

Figure 5:
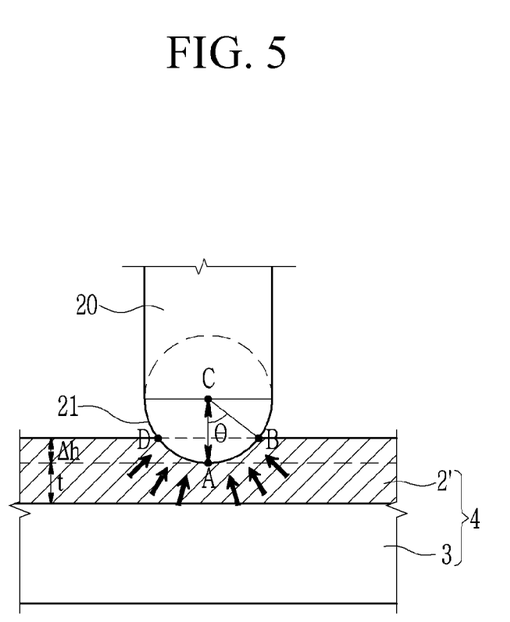
FIG. 5 is a view showing that a specimen is deformed by heating in the deformation measuring apparatus shown in FIG. 1.

FIG. 5 is a view showing how the specimen is deformed by heating. Referring to FIG. 5, the thermal expansion (Δh) of the film occurs in a thickness direction when the temperature in the heating chamber 40 is increased. In an embodiment, the thermally expanded film 2' may further have a thermally-expanded thickness Δh, in addition to the original thickness t. However, since the hemispherical tip 21 in contact with the thermal expanded film 2' is fixed, the area of the film 2 around the hemispherical tip 21 is blocked by the hemispherical tip 21 to prevent being further expanded. Instead, the driving force inducing the thermal expansion (Δh), which is a thermal deformation force (F), is applied to the hemispherical tip 21 along with bold arrow directions of FIG. 5.

Thus, in such an embodiment, at least one of the thermal deformation force (F) and the thickness direction thermal expansion (Δh) of the film 2 caused by the heating may be measured.

In an embodiment, referring to FIG. 5, the thickness direction thermal expansion (Δh) may be represented by the following equation: Δh=r(1−cos θ), where θ denotes an angle between $\overline{AC}$ and $\overline{BC}$ in a relationship with two points B,D, which are in contact with the hemispherical tip 21 by the thermal expansion (Δh) in the thickness direction of the specimen 4. When the above equation is rewritten, θ may be represented by $$\theta = \cos^{-1}\left(1 - \frac{\Delta h}{r}\right).$$

In an embodiment, the deformation measuring apparatus may continuously measure how the thermal deformation force (F) and the thickness direction thermal expansion (Δh) of the thermally expanded film 2' are changed according to the inner temperature of the heating chamber 40.

Subsequently, it may evaluate how the film is deformed by heating, using at least one of the thermal deformation force (F) and the thickness direction thermal expansion (Δh) of the expanded film 2'. In an embodiment, each of a thermal deformation (ΔL), a thermal stress (σ), and a thickness direction elastic modulus (M) of the film may be evaluated.

According to an embodiment, the thermal deformation (ΔL) of the film means a difference ($L_1$–$L_0$) of a length ($L_1$) of a portion of the thermally expanded film 2' that is in contact with the hemispherical tip 21 from the length ($L_0$) of the corresponding portion of the thermally expanded film 2' before the deformation, based on the cross-sectional surface cut along with a thickness direction of the specimen 4.

According to an embodiment, the thermal deformation (ΔL) may be evaluated using the thickness direction thermal expansion (Δh) of the specimen 4. In such an embodiment, as shown in FIG. 5, $L_1$ denotes a length of a portion of the hemispherical tip 21 that is in contact with the thermally expanded film 2' due to the thickness direction thermal expansion (Δh) of the specimen 4.

In such an embodiment, $L_1$ may be represented by a length $\overline{DB}$ of an arc connecting the two points D, B in FIG. 5. That is, $L_1$ satisfies the following equation:

$$L_1 = \pi r \times \frac{\theta}{180}.$$

In such an embodiment, the length ($L_0$) before deformation of the film surface may be presented by a length $\overline{DB}$ of an imaginary line connecting the two points D,B in FIG. 5. Accordingly, the length ($L_0$) before deformation of the film surface may satisfy the following equation: $L_0$=r sin θ.

Accordingly, the thermal deformation (ΔL) of the film may satisfy the following equation:

$$\Delta L = L1 - L0 = \frac{\pi r \times \frac{\theta}{180} - r\sin\theta}{r\sin\theta} \times 100.$$

In an embodiment, the thermal stress (σ) of the film means a value of dividing a thermal deformation force (F) of the film by a contact area (S), when the contact area (S) is defined as an area covered by the hemispherical tip 21 in a plane including the uppermost surface of the thermal expanded film 2'. That is, the area covered by the hemispherical tip 21 in the plane including a line connecting two points (B,D) positioned on the uppermost of the thermally expanded film 2' in FIG. 5 may be represented by πr(sin θ)².

In such an embodiment, when θ is defined by a value excepting the thickness direction thermal expansion (Δh) of the film, θ may be represented by an equation based on a coefficient of linear expansion (α) of a material for the film 2 and a temperature change (ΔT) by heating, thereby satisfying the following equation:

$$\theta = \cos^{-1}\left(1 - \frac{\alpha \Delta T}{r}\right).$$

Accordingly, the thermal stress (σ) of the film may be evaluated without measuring a thickness direction thermal expansion (Δh) of the film 2 using the following equation:

$$\sigma = \frac{F}{\pi (r \sin \theta)^2}.$$

According to an embodiment, the thickness direction elastic modulus (M) of the film may be obtained by dividing a thermal stress (σ) of the film 2 by a thermal deformation (ΔL) of the film, where the thermal deformation (ΔL) of the film is calculated using the thickness direction thermal expansion (Δh) of the film, and the thermal stress (σ) of the film is calculated using the thermal deformation force (F).

In an embodiment, the thickness direction elastic modulus (M) of the film may satisfy the following equation:

$$M = \frac{F}{\Delta L} = \frac{F}{100 \times \pi r \sin\theta \left(\pi r \times \frac{\theta}{180} - r\sin\theta\right)}$$

Thus, the thermal deformation force (F) of the film and the thickness direction thermal expansion (Δh) are calculated using the deformation measuring apparatus, and then the thermal deformation (ΔL), the thermal stress (σ) and the thickness direction elastic modulus (M) of the film may be calculated by the equations based on the thermal deformation force (F) and/or the thickness direction thermal expansion (Δh).

Herein, although an embodiment describes the measuring and evaluating methods with a "film-substrate type specimen," a "bulk type specimen" may be measured and evaluated for the deformation according to embodiments of the method as described herein. In an embodiment where the specimen 4 is the "bulk type specimen," the measuring and evaluating methods is substantially identical to the measuring and evaluating methods in which the specimen 4 is the "film-substrate type specimen", except that the substrate 3 is omitted from the specimen 4.

Generally, a universal testing machine ("UTM") or a dynamic mechanical analyzer ("DMA") for measuring properties of materials is designed for measuring in-plane direction properties for materials, so when the material has a shape such as a film, it may be difficult to measure thickness direction properties of materials.

In addition, even in the case of nano-indenter for measuring thickness direction properties of materials, since it employs nano-scaled indenter, the deviation thereof is huge according to the surface state of material, and an error of the area where the indenter is in contact with the material is huge, so the thickness direction deformation of the material may be not standardized.

In an embodiment, the deformation measuring apparatus may measure and evaluate the various deformation properties of a material to be measured in a relatively simple method even without damaging the material to be measured, so the thickness direction deformation properties of materials having a variety shape such as a thin film, a thick film and bulk and/or a variety of materials may be easily standardized.

Hereinafter, the measuring and the evaluating properties of a material using an embodiment of a deformation measuring apparatus will be described in detail with reference to Examples. However, these examples are only exemplary, and the disclosure is not limited thereto.

FABRICATION OF SPECIMENS ACCORDING TO EXAMPLES 1 TO 4

1 gram (g) to 3 g of a polyvinyl alcohol ("PVA") resin is coated on a lithium-metal substrate using a solvent casting method and then cured to provide a specimen according to Example 1. The obtained polyvinyl alcohol thin film has a thickness in a range of 50 μm to 300 μm.

A specimen according to Example 2 is fabricated in accordance with the same procedure as in Example 1, except using a resin prepared by mixing polyvinyl alcohol and a fused silica in a volume ratio of 3:1.

A specimen according to Example 3 is fabricated in accordance with the same procedure as in Example 1, except using a resin prepared by mixing polyvinyl alcohol and a fused silica in a volume ratio of 3:2.

A specimen according to Example 4 is fabricated in accordance with the same procedure as in Example 1, except using a resin prepared by mixing polyvinyl alcohol and a fused silica are mixed in a volume ratio of 3:4.

MEASUREMENT OF THERMAL EXPANSION FORCE AND THERMAL EXPANSION IN EXAMPLES 1 TO 4

Each specimen prepared from Examples 1 to 4 is disposed between a hemispherical tip having a radius of curvature of 0.35 millimeter (mm) or 0.5 mm and a holder, and the thermal expansion force and the thermal expansion degree of the specimen are measured while a heating chamber is slowly heated from a temperature of 60° C. to a temperature of 80° C. for 30 minutes under a nitrogen gas atmosphere.

Figure 6:
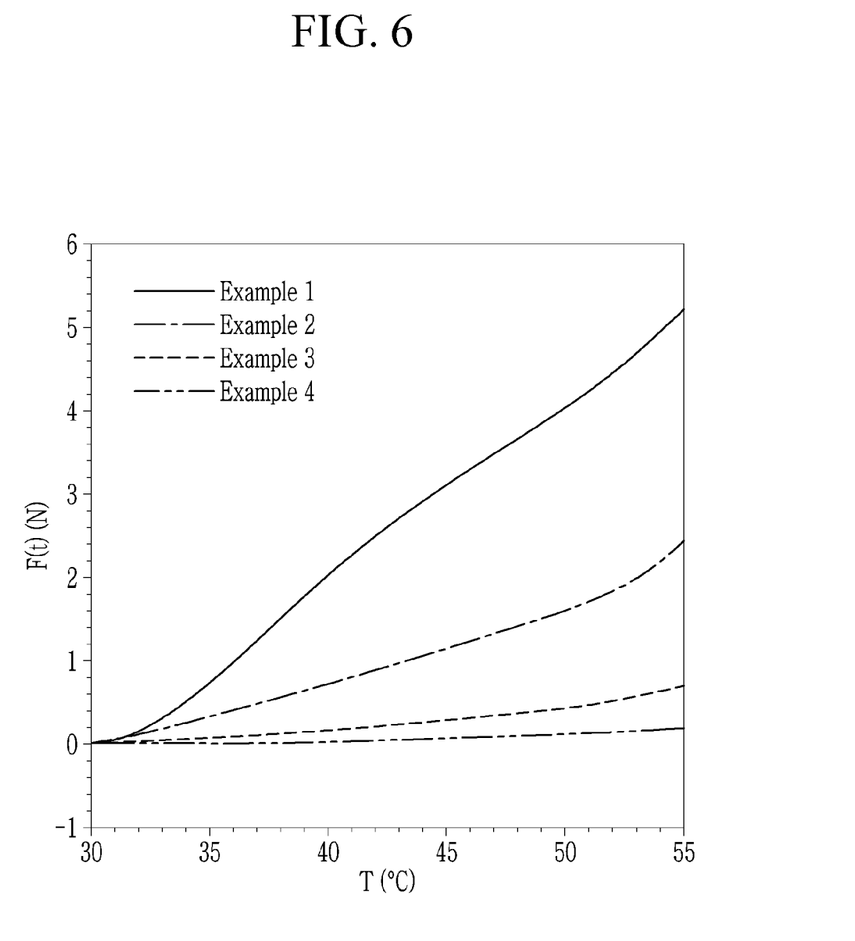
FIG. 6 is a graph showing results of measuring temperature (T)-thermal deformation force (F(t)) relationships of specimens according to Examples 1 to 4 using the deformation measuring apparatus according to an embodiment.
Figure 7:
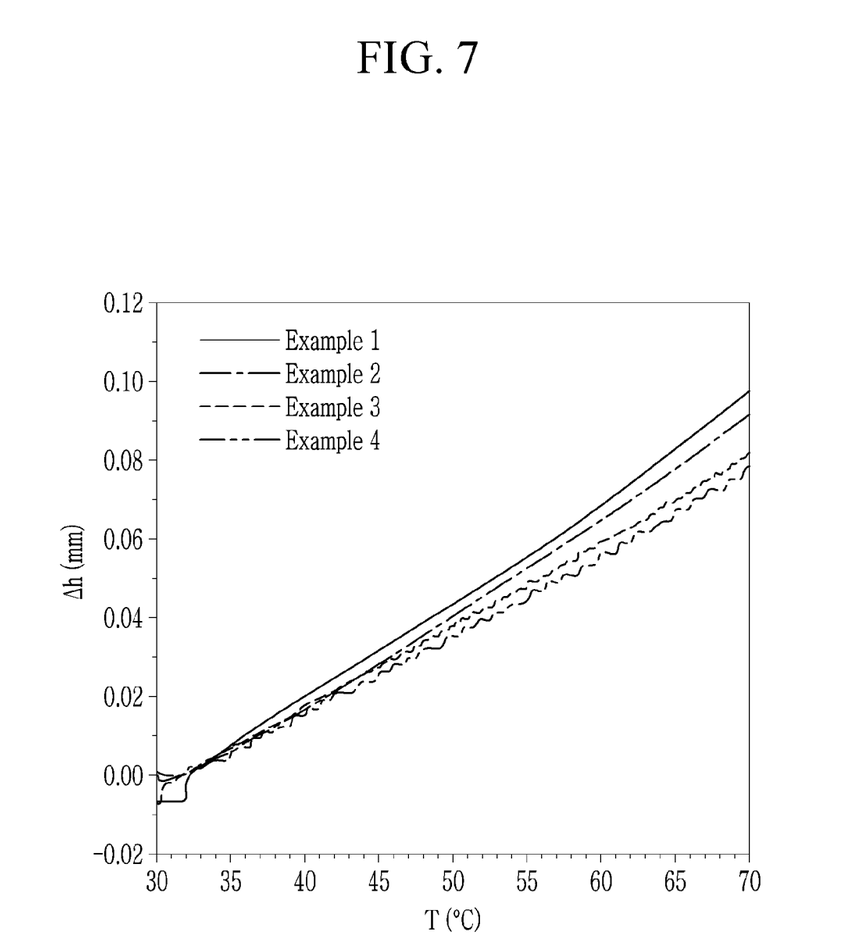
FIG. 7 is a graph showing results of measuring temperature (T)-thermal expansion ($\Delta h$) relationships of specimens according to Examples 1 to 4 using the deformation measuring apparatus according to an embodiment.

FIG. 6 is a graph showing results of measuring relationships of a temperature (T)-thermal deformation force (F(t)) of the thin films for Examples 1 to 4 using the deformation measuring apparatus according to an embodiment, and FIG. 7 is a graph showing results of measuring relationships of temperature (T)-thermal expansion (Δh) of the specimens for Examples 1 to 4 using the deformation measuring apparatus according to an embodiment. In FIGS. 6 and 7, the hemispherical tip has a radius of curvature of 0.35 mm.

Referring to FIGS. 6 and 7, it is shown that the thin film has the higher thermal expansion force and the higher thermal expansion degree as having the higher content of polyvinyl alcohol in the material to be measured. This is estimated because the thermal expansion coefficient of the thin film is getting increased while the content of inner salt (fused silica) of the thin film is more increased from Example 1 to Example 4, so the thermal expansion force and the thermal expansion are getting decreased.

FABRICATION OF SPECIMENS ACCORDING TO EXAMPLES 5 to 8

A specimen according to Example 5 uses a polyethylene ("PE") film having a thickness of about 15 μm. The specimen of Example 5 is the "bulk type specimen".

A specimen according to Example 6 uses an aluminum foil (YooSung Total Metals) having a thickness of about 30 μm. The specimen of Example 6 is the "bulk type specimen".

A specimen according to Example 7 is fabricated in accordance with the same procedure as in Example 1, except that 2 g of a polydimethylsiloxane ("PDMS") resin is coated on a glass substrate and cured. The specimen of Example 7 is the "film-substrate type specimen", and the polydimethylsiloxane thin film has a thickness of 1 mm.

A specimen according to Example 8 uses a polyethyleneterephthalate ("PET") film (Toray Engineering) having a thickness of about 50 μm. The specimen of Example 8 is the "bulk type specimen".

MEASUREMENT OF THERMAL EXPANSION FORCE AND THERMAL EXPANSION IS EXAMPLES 5 TO 8

Each specimen obtained from Examples 5 to 8 is disposed between a hemispherical tip having a radius of curvature of about 0.35 mm or about 0.5 mm and a holder, and the specimen is measured for a thermal expansion force and a thermal expansion while a temperature in the heating chamber is slowly increased from the temperature of about 60° C. to the temperature of about 80° C. for 30 minutes under the nitrogen gas atmosphere.

Figure 8:
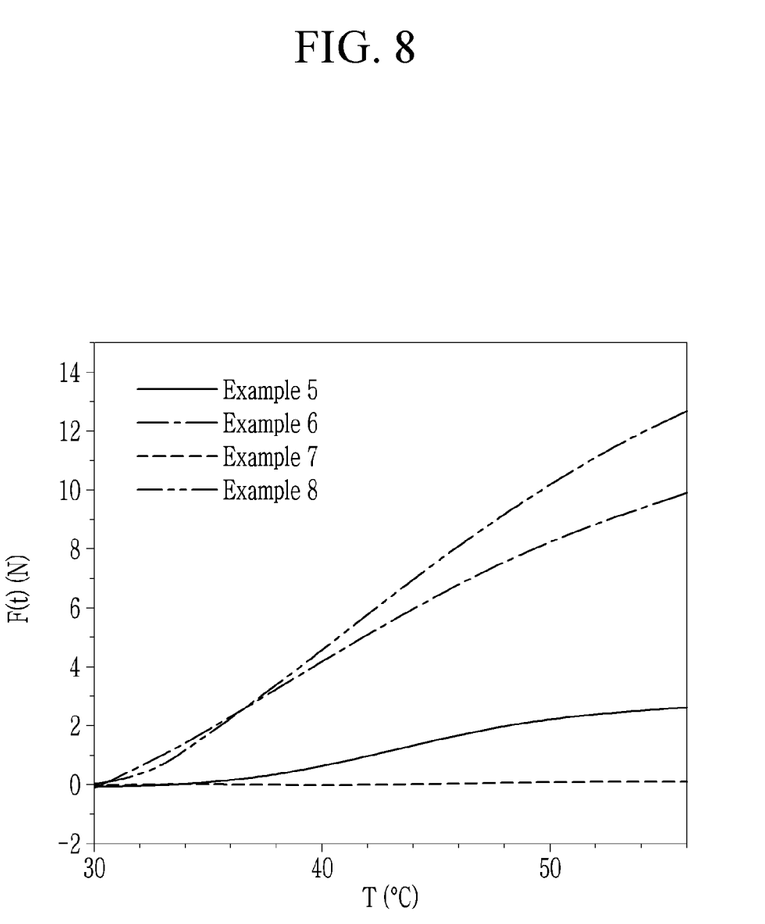
FIG. 8 is a graph showing results of measuring temperature (T)-thermal deformation force (F(t)) relationships of specimens according to Examples 5 to 8 using the deformation measuring apparatus according to an embodiment.
Figure 9:
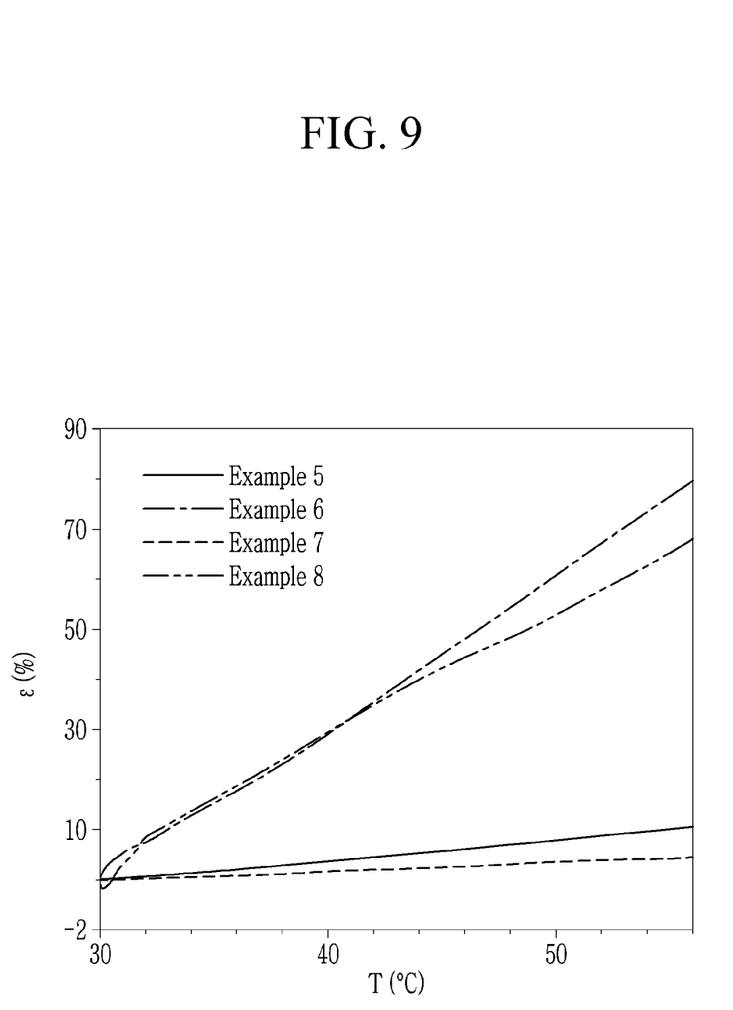
FIG. 9 is a graph showing results of measuring temperature (T)-thickness strain ($\epsilon$) relationships of specimens according to Examples 5 to 8 using the deformation measuring apparatus according to an embodiment.

FIG. 8 is a graph showing the results of measuring relationships of temperature (T)-thermal deformation force (F(t)) of the thin films according to Examples 5 to 8 using the deformation measuring apparatus according to an embodiment, and FIG. 9 is a graph showing the results of measuring relationships of temperature (T)-thickness strain (ε) of the specimens according to Examples 5 to 8 using the deformation measuring apparatus according to an embodiment. The hemispherical tip in FIGS. 8 and 9 has a radius of curvature of 0.35 mm.

In FIG. 9, the thickness strain (ε) may be obtained by comparing a thickness ($\varepsilon_1$) increased by the thermal expansion to the initial thickness ($\varepsilon_0$) of the specimen, which may be represented by $$\varepsilon = \frac{\varepsilon_1 - \varepsilon_0}{\varepsilon_0} \times 100.$$

Referring to FIGS. 8 and 9, it is shown that the bulk type specimen may be easily measured for deformation using the measuring apparatus according to an embodiment, as well as the film-substrate type specimen in which the material to be measured is filmed. In addition, it is shown that in all Examples 5 to 8, both the thermal expansion force and the thickness strain are linearly increased as the temperature is increased from about 30° C. to about 60° C.

For Examples 6 to 8, the thickness direction elastic modulus (M) is measured using the deformation measuring apparatus, and in-plane direction elastic modulus (M') is measured using a dynamic mechanical analyzer ("DMA"), and then each result is shown in the following Table 1:

TABLE 1

| | Material | In-plane direction elastic modulus M' (GPa) | Thickness direction elastic modulus M (GPa) | M/M' |
|---|---|---|---|---|
| Example 6 | aluminum | 20.1 | 23.0 | 1.1 |
| Example 7 | PDMS | 2.24 | 17.5 | 7.8 |
| Example 8 | PET | 5.1 | 11.7 | 2.3 |

Table 1 shows that the elastic modulus of Example 6 has little difference between the in-plane direction and the thickness direction; but the elastic modulus of Examples 7 and 8 show the minimum difference of 2 times to the maximum difference of about 8 times.

First, in Example 6, as aluminum atoms are arranged to have isotropicity due to a metallic bond, the elastic modulus difference is hardly found between the in-plane direction and the thickness direction. However, as the backbone is arranged in-plane direction in a case of a thin film of polymer materials such as Examples 7 and 8, it is estimated that the thickness direction elastic modulus is higher than the in-plane direction elastic modulus.

Using the measuring apparatus according to an embodiment, the properties of materials, which was difficult to find by only the conventional in-plane direction measurement, may be easily found.

While the invention has been described in connection with what is presently considered to be practical example embodiments, it is to be understood that the invention is not limited to the disclosed embodiments, but, on the contrary, is intended to cover various modifications and equivalent arrangements included within the spirit and scope of the appended claims.

What is claimed is:

1. A deformation measuring apparatus comprising:
a holder which supports a specimen;
a contact portion disposed facing the holder and comprising a hemispherical tip;
a position controlling portion which adjusts a position of the contact portion along a thickness direction of the specimen to allow the hemispherical tip to be in contact with a surface of the specimen;
a heating chamber which surrounds the holder and the contact portion, wherein a temperature of inside of the heating chamber is controlled to heat the specimen to expand; and
a sensing portion which measures force applied on the tip of the contact portion by the expanded specimen when heated,
wherein the sensing portion measures the force applied on the tip of the contact portion while a position of the tip of the contact portion relative to the holder is fixed during the heating of the specimen.

2. The deformation measuring apparatus of claim 1, wherein the position controlling portion comprises:
a linear transporting portion connected to the contact portion, wherein the linear transporting portion linearly moves along a thickness direction of the specimen in the heating chamber, and
an operation controller which controls an operation of transporting the linear transporting portion or fixes the linear transporting portion in a predetermined position.

3. The deformation measuring apparatus of claim 2, wherein the heating chamber comprises:
a body surrounding the holder and the contact portion;
a door mounted in a side of the body to allow the specimen to be disposed inside the body; and
a through-hole defined in an upper part of the body, wherein the linear transporting portion linearly moves in the heating chamber through the through-hole.

4. The deformation measuring apparatus of claim 1, wherein the sensing portion is electrically connected to the contact portion or the position controlling portion.

5. A method of evaluating a thickness direction deformation of the specimen using the deformation measuring apparatus of claim 1, the method comprising:
disposing the specimen on the holder to face the contact portion;

adjusting a position of the contact portion along the thickness direction of the specimen so that the hemispherical tip of the contact portion is in contact with the surface of the specimen;

measuring the thermal deformation force (F) of the specimen, or the thickness direction thermal expansion (Δh) of the specimen while heating the specimen; and evaluating the thickness direction deformation of the specimen using the measured thermal deformation force of the specimen, or the measured thickness direction thermal expansion of the specimen.

6. The method of claim 5, further comprising:

fixing the position of the disposed contact portion when the contact portion is in contact with the surface of the specimen.

7. The method of claim 5, wherein the specimen is heated by increasing an inner temperature of the heating chamber.

8. The method of claim 5, wherein the evaluating the thickness direction deformation of the specimen comprises:

calculating a length ($L_1$) of a portion of the surface of the heated specimen, which is in contact with the hemispherical tip using the measured thickness direction thermal expansion (Δh) of the specimen, based on a cross-sectional surface cut along the thickness direction of the specimen; and comparing the calculated length of the portion of the surface of the heated specimen in contact with the hemispherical tip to a length ($L_0$) of a corresponding portion of the surface of the specimen before being heated, to calculate a thermal deformation ($\Delta L = L_1 - L_0$) of the specimen.

9. The method of claim 8, wherein the thermal deformation (ΔL) of the specimen satisfies the following equation:

$$\Delta L = \frac{\pi r \times \frac{\theta}{180} - r\sin\theta}{r\sin\theta} \times 100,$$

wherein $$\theta = \cos^{-1}\left(1 - \frac{\Delta h}{r}\right),$$

and r denotes a radius of curvature of the hemispherical tip.

10. The method of claim 5, wherein the evaluating the thickness direction deformation of the specimen comprises:

calculating a thermal stress (σ) of the specimen using a contact area (S) and the measured thermal deformation force (F) of the heated specimen, wherein the contact area (S) is defined as an area covered with the hemispherical tip in a plane among an uppermost surface of the specimen.

11. The method of claim 10, wherein the thermal stress (σ) satisfies the following equation:

$$\sigma = \frac{F}{\pi(r\sin\theta)^2},$$

wherein $$\theta = \cos^{-1}\left(1 - \frac{\alpha \Delta T}{r}\right),$$

r denotes to a radius of curvature of the hemispherical tip,

α denotes a linear expansion coefficient of the specimen, and

ΔT denotes a temperature change according to the heating.

12. The method of claim 5, wherein the evaluating the thickness direction deformation of the specimen by the heating comprises:

calculating a thermal deformation (ΔL) of the specimen using the measured thickness direction thermal expansion (Δh) of the specimen;

calculating a thermal stress (σ) of the specimen using the measured thermal deformation force (F) of the specimen; and calculating an elastic modulus (M) of the specimen using the calculated thermal deformation (ΔL) of the specimen and the calculated thermal stress (σ) of the specimen.

13. The method of claim 12, wherein the elastic modulus (M) satisfies the following equation:

$$M = \frac{F}{100 \times \pi r \sin\theta \left(\pi r \times \frac{\theta}{180} - r\sin\theta\right)},$$

wherein $$\theta = \cos^{-1}\left(1 - \frac{\Delta h}{r}\right),$$

and r denotes a radius of curvature of the hemispherical tip.

14. The apparatus of claim 1, wherein the tip has a radius of curvature in a range of about 0.1 micrometer to about 5 millimeters.

* * * * *